United States Patent [19]

Paff et al.

[11] Patent Number: 4,833,534
[45] Date of Patent: May 23, 1989

[54] SURVEILLANCE ASSEMBLY HAVING ENHANCED SHIELDING AND REDUCED SIZE

[75] Inventors: Robert Paff, Boca Raton; Edwin Thompson, Loxahatchee, both of Fla.

[73] Assignee: Sensormatic Electronics Corporation, Deerfield Beach, Fla.

[21] Appl. No.: 157,803

[22] Filed: Feb. 19, 1988

[51] Int. Cl.$^4$ ............................................. H04N 7/18
[52] U.S. Cl. .................................... 358/108; 358/210; 358/213.11; 358/229
[58] Field of Search ............... 358/108, 225, 229, 210, 358/213.11

[56] References Cited

U.S. PATENT DOCUMENTS

| | | | |
|---|---|---|---|
| 3,720,147 | 3/1973 | Bemis | 358/108 |
| 3,739,703 | 6/1973 | Behles | 358/108 |
| 3,819,856 | 6/1974 | Pearl, deceased et al. | 358/108 |
| 3,916,097 | 10/1975 | Imai | 358/108 |
| 4,080,629 | 3/1978 | Hammond | 358/108 |
| 4,120,004 | 10/1978 | Coutta | 358/108 |
| 4,160,999 | 7/1979 | Claggett | 358/108 |
| 4,217,606 | 8/1980 | Nordmann | 358/108 |
| 4,225,881 | 9/1980 | Tovi | 358/108 |
| 4,320,949 | 3/1982 | Pagano | 358/108 |
| 4,594,613 | 6/1986 | Shinbori | 358/213.11 |
| 4,600,938 | 7/1986 | Sluyter | 358/229 |
| 4,672,219 | 6/1987 | Iwabuchi | 358/213.11 |
| 4,736,218 | 5/1988 | Kutman | 358/108 |

Primary Examiner—Howard W. Britton
Attorney, Agent, or Firm—Robin, Blecker & Daley

[57] ABSTRACT

A surveillance assembly wherein the assembly utilizes a solid state image pickup which is separately mounted from a camera body of a solid state camera and wherein a shutter is utilized for shielding the viewing region of the assembly.

33 Claims, 5 Drawing Sheets

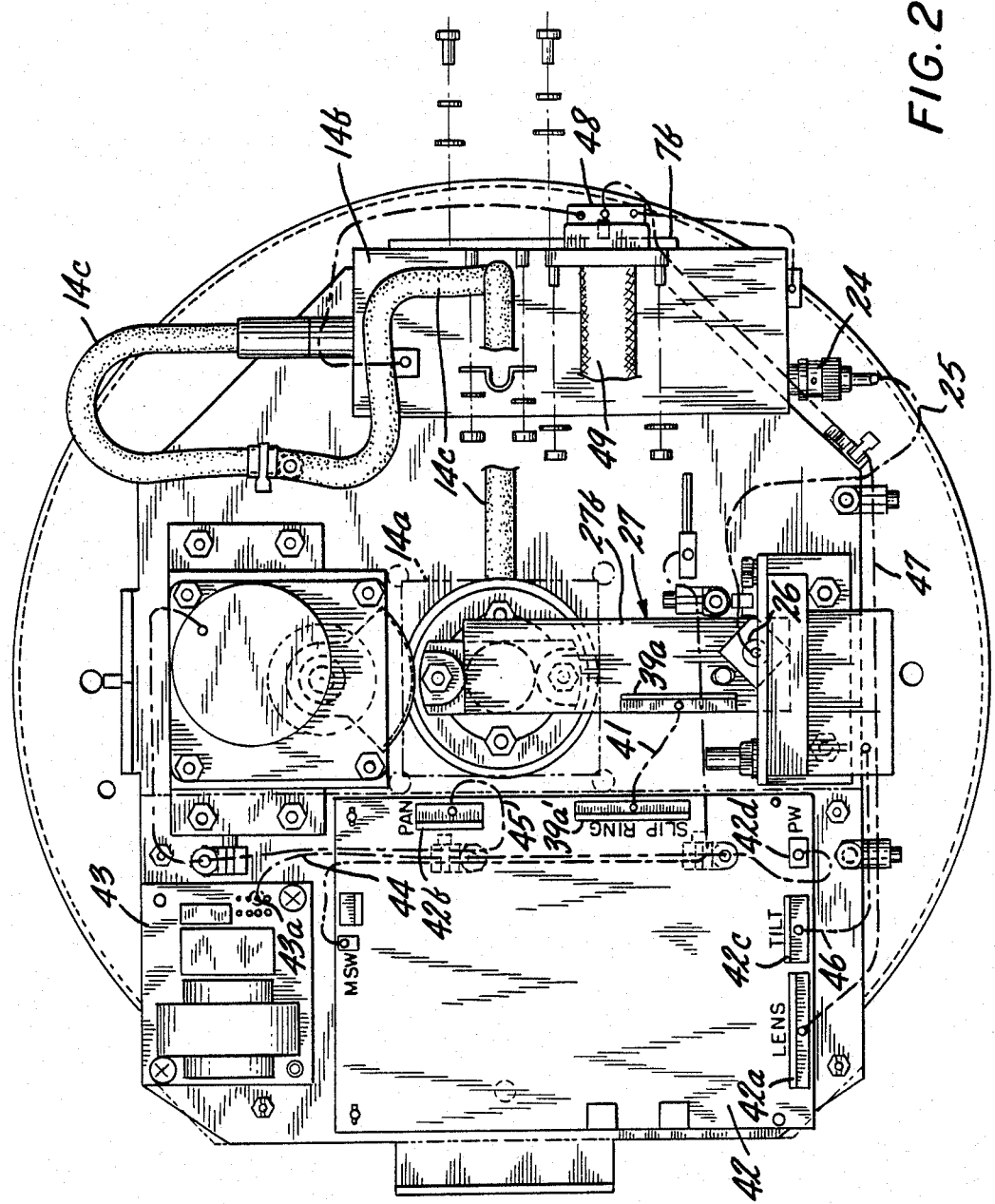

SURVEILLANCE ASSEMBLY HAVING ENHANCED SHIELDING AND REDUCED SIZE

BACKGROUND OF THE INVENTION

This invention relates to surveillance assemblies, and, in particular, to surveillance assemblies utilizing cameras housed within enclosures.

Surveillance assemblies have now been developed for use in retail, industrial and other types of establishments wherein the surveillance assemblies employ cameras to monitor the area under surveillance. These surveillance assemblies also employ enclosures to house and ceiling mount their respective cameras. Typical types of enclosures in use today include a top housing, usually in shell form, in which the camera components are housed and which is supported above the ceiling surface. A bottom cover, usually in the form of a dome-like member, extends below the ceiling surface and is attached to the top housing for enclosing the camera components.

In designing the above surveillance assemblies, designers have been faced with the problem of trying to make the assemblies as inconspicuous as possible. Also, a further problem has been to arrange the assemblies so as to make it difficult to determine the assembly viewing direction. The need for an inconspicuous structure stems from the demands of purchasers of these assemblies who for various reasons, such as, for example, aesthetics and customer relations, desire the assemblies to be unobtrusive. The need to shield the viewing direction, in turn, is based on the desire to prevent the avoidance of surveillance merely by keeping out of the viewing direction of the assembly.

In early surveillance assemblies, the dome-like covers were necessarily of large diameter and depth, due to the size of the cameras and lenses used and due to the need to pivot or tilt these components along their longer dimensions (i.e., their lengths). Similarily, early attempts at hiding the viewing direction of these assemblies centered around tinting the dome-like cover and/or utilizing a viewing slot in an otherwise opaque inner dome-like shroud member.

One assembly developed by the assignee of the present application and sold under the trademark "Sensorvision" provided for use of a mirror to fold or redirect the viewing direction of the lens and camera. Thus, by placing a mirror at a 45° angle and in line with the common viewing direction of the camera and lens, the latter components could be pivoted jointly with the lens along their shorter or width dimensions to obtain the desired scanning of the viewing direction. This allowed for a smaller size of the dome-like cover and, as a result, a reduced observability of the surveillance assembly. Also, shielding of the camera and lens in this design was achieved by using an inner shroud with a slot and by providing various levels of indentations in the shroud.

While the "Sensorvision" surveillance assembly has proven to be an effective unit, the size of the dome-like cover which protrudes below the ceiling is still relatively large, it being 24 inches in diameter and 7 inches in depth. Furthermore, the use of a slotted shroud for camouflage was found not to provide total shielding, particularly when viewing the unit from a direction in back of the slot.

Designers of the assignee of the present application have, therefore, continued to explore possible alternative surveillance assemblies. One alternative assembly looked to replacing the normal tube-type camera in the "Sensorvision" assembly with a solid state camera. Such cameras are of small overall dimension and, thus, offer the possibility of reduced size.

In order to effect replacement of the normal tube-type camera by a solid state camera in the "Sensorvision" assembly, it was found that further processing electronics would have to be used. These electronics were needed to reorient the image which was inverted by use of the mirror. In the normal tube-type camera, reorientation of the image could be accomplished simply by switching two leads in the camera. This approach was not possible in the smaller solid state cameras owing to the use in these cameras of a solid state pickup for receiving the image. Accordingly, the need for additional electronic processing and its attendant disadvantages of increased size and cost negated to a large degree the advantage of reduced size of the solid state cameras.

Another possible alternative assembly looked to using the solid state camera without a mirror and arranged, as in the aforementioned prior art assemblies, to be pivoted about its length. This arrangement, however, still required dimensions for the dome-like cover which were fairly large. Also, when a solid state camera is used in this way with a slotted shroud for shielding, the slot tends to become more visible, particularly from the rear of the slot, making shielding more difficult.

It is, therefore, a primary object of the present invention to provide a surveillance assembly of reduced size.

It is also a primary object of the present invention to provide a surveillance assembly with enhanced shielding.

It is a further object of the present invention to provide a surveillance assembly using a solid state camera in a way to achieve a dome-like cover of reduced width and depth.

It is yet a further object of the present invention to provide a surveillance assembly employing a slotted inner shroud and further adapted to reduce the visibility of the slot.

SUMMARY OF THE INVENTION

In accordance with the principles of the present invention, the above and other objectives are realized, in part, in a surveillance assembly utilizing a solid state camera in which the image pickup of the camera is separate from the camera body which houses the controls for the pickup and the other camera components. In particular, a mounting is provided for the assembly which enables the image pickup to be mounted pivotally and in alignment with the viewing lens of the assembly along a viewing direction and which also enables mounting of the camera body separate from the pickup and other than with its longest dimension directed in or along the viewing direction. As a result, the surveillance assembly need not accommodate an in-line length of lens, image pickup and camera body and pivoting of these components along their combined length. The dome-like cover of the assembly can, therefore, be reduced both in diameter and depth, allowing for an overall reduction in the size of the assembly.

In further accord with the invention, the above and other objectives are also realized, in part, in a surveillance assembly wherein a defined, light transmissive viewing region (such as the aforementioned slot in a dome-like shroud) is used, and wherein means is provided for blocking light transmission through portions of the viewing region other than the portion presently being used for viewing. In this way, light is not transmitted into the assembly through these blocked portions, providing enhanced camouflaging of the assembly. In the embodiment of the invention to be disclosed hereinafter, the blocking means is in the form of a shutter which pivots with the viewing lens of the assembly to block light transmission through portions of the defined viewing region below the portion through which the lens is viewing.

DESCRIPTION OF THE DRAWINGS

The above and other features and aspects of the present invention will become more apparent upon reading the following detailed description in conjunction in the accompanying drawings, in which:

FIG. 2 shows schematically in plan view a portion of the assembly of FIGS. 1A and 1B;

DETAILED DESCRIPTION

Figure 1A:
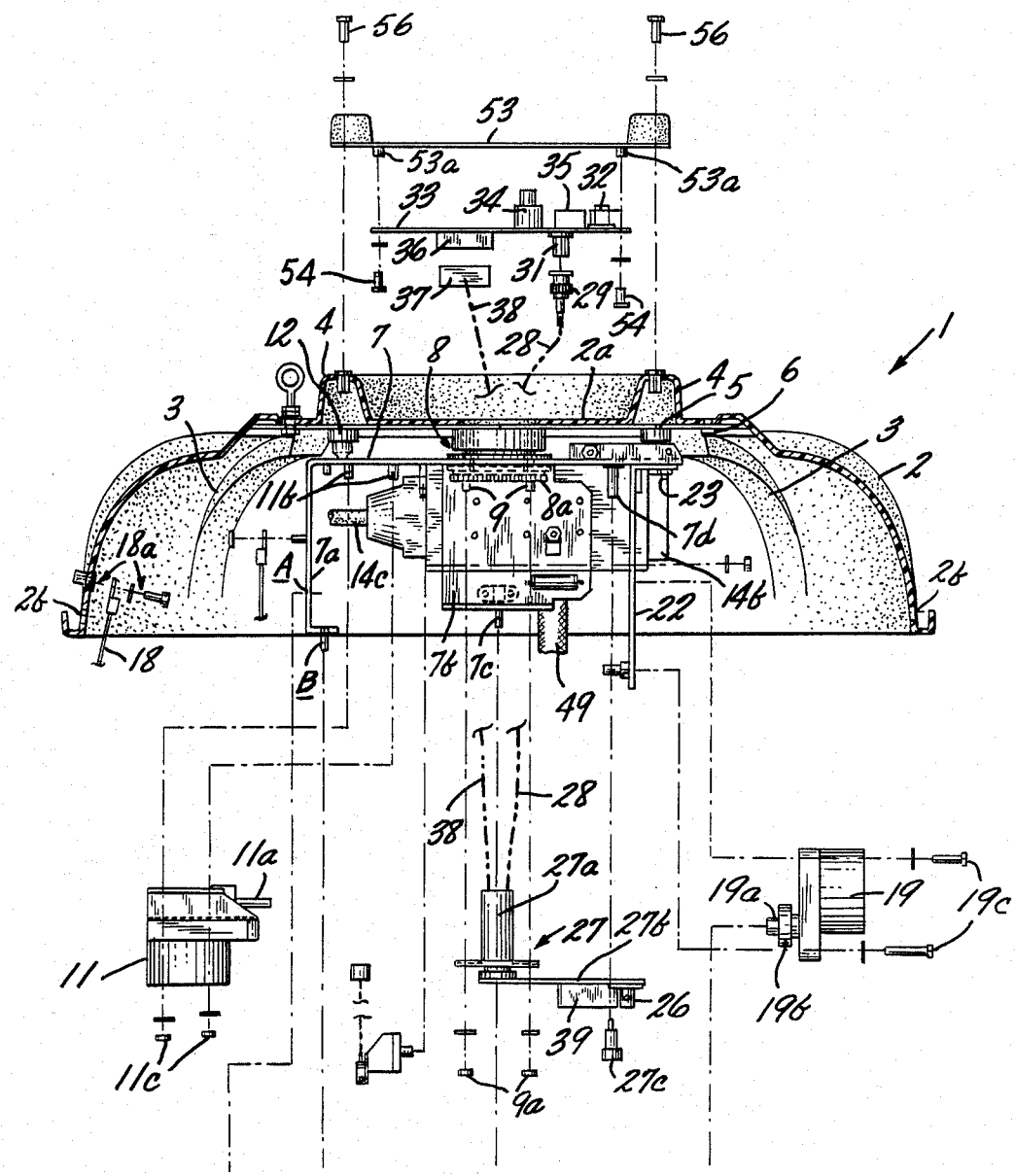
FIGS. 1A and 1B taken together an exploded, pictorial view of a surveillance assembly in accordance with the principles of the present invention.
Figure 1B:
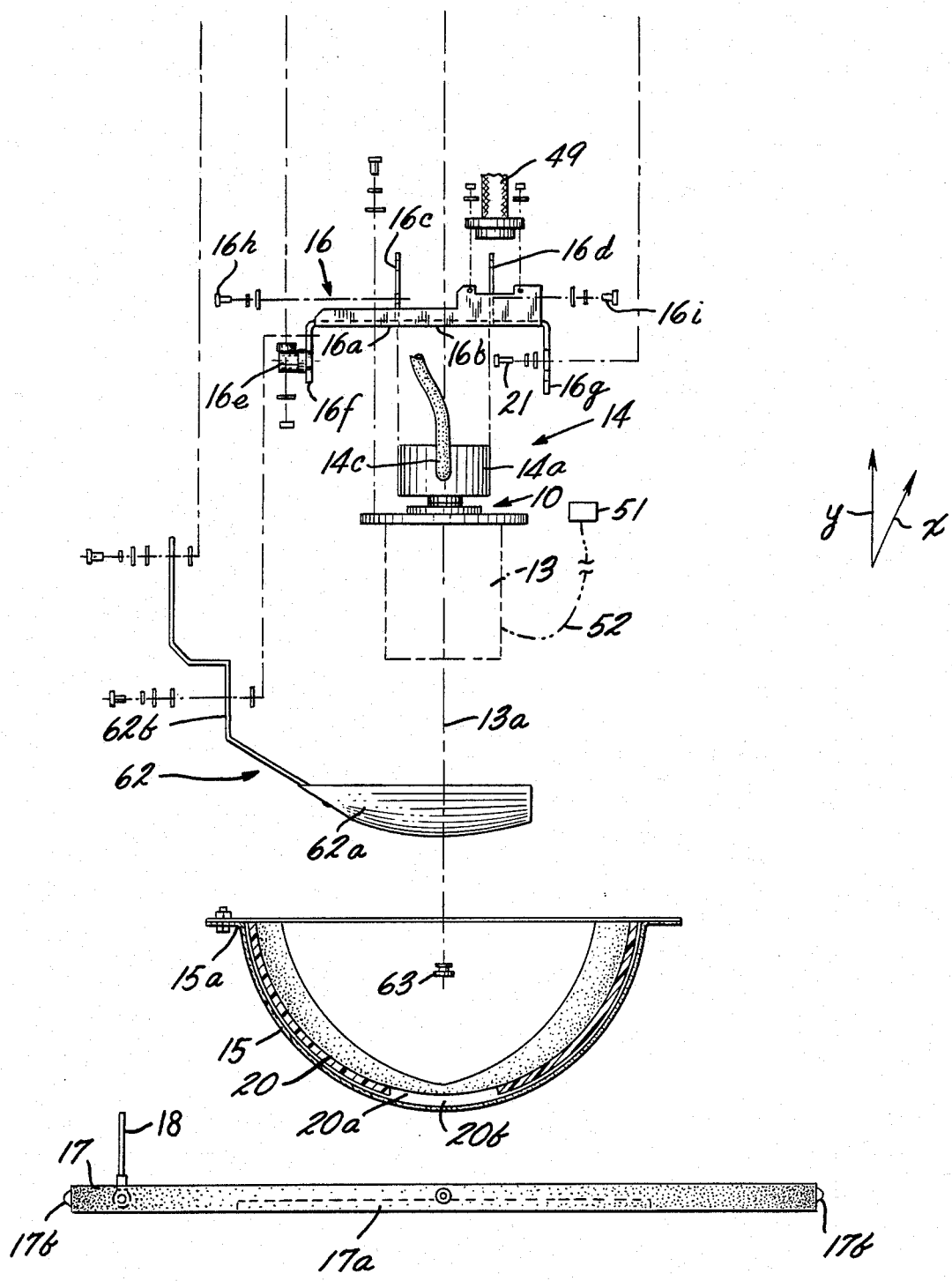

FIGS. 1A and 1B illustrates a surveillance assembly 1 in accordance with the principles of the present invention. The assembly 1 comprises a shell-like support housing 2 which houses the main components of the assembly. The housing 2 can typically be made of a hard plastic and is provided with internal ribs 3 to add strength to the housing. The housing is also provided with flange 4 which is used to support the housing when the assembly is in storage and not in use.

The central area 2a of the housing 2 is strengthened by the presence of a metal plate 5 which is bolted to the housing via screws 6. A further plate 7 situated below the metal plate 5 is rotably mounted to the central area 2a via a bearing assembly 8. The assembly 8 is bolted to the housing via bolts 9 and nuts 9a and at its lower end carries a fixed gear 8a.

Threaded members 11b on the plate 7 and corresponding nuts 11c serve to fix a drive or pan motor 11 on the plate 7 so that the drive gear 11a of the motor engages the fixed gear 8a. As a result, operation of the pan motor 11 causes rotation of the plate 7 which rides on bearings located above fixed gear 8a. Stabilizer bearings 12 mounted to the plate 5 are provided to accomodate momentary embalances in the plate 7 during rotation.

The above rotation of the plate 7 allows the plate to be rotated 360° about a vertical or y axis. The viewing direction 13a of the assembly 1 can, therefore, be made to pan the entire area under surveillance.

The assembly 1 is further provided with a viewing means or lens 13 which defines the aforementioned viewing direction 13a. The lens 13 views the surveillance area along the direction 13a as the assembly 1 pans and provides an image of the viewed surveillance area to a camera assembly 14 which converts the image into a video signal. This signal may then be transmitted to a control station where it is displayed on a TV monitor for real time monitoring of the surveillance area or the signal may be recorded for subsequent viewing of the area.

A dome-like cover 15 transmissive to light encloses the above-mentioned components of the assembly 1. Upstanding plates 7b and 7b' integral with the plate 7 receive a flanged area 15a of the dome at threaded rods 7c and 7c' and are secured to the rod via nuts 63. The dome is thereby held to the plate 7 and rotates with the plate.

An outer skirt 17 borders the exterior of the dome 15 and has a central aperture 17a through which the dome protrudes. The skirt is held to the housing 2 via projections 17b which engage holes 2b at the upper edge of the housing. A lanyard 18 mounted by mounting 18a holds the skirt to the housing when the projections 17b are disengaged from the holes 2b.

Interior of the dome 15 is a further dome-like member or shroud 20 which is also secured to and rotates with the plate 7 similarly as the cover dome 15. Shroud 20 is designed to provide camouflage for the assembly 1. In particular, the shroud is totally opaque so as to block the passage of light except for a defined viewing region which is aligned with viewing direction 13a of the assembly. In the present illustrative case, the viewing region is in the form of a slot 20a in the shroud which runs from the apex 20b of the shroud vertically circumferentially through an angle of approximately 90° and horizontally circumferentially through an angle of approximately 25° (see, FIGS. 5–7). This permits the viewing direction 13a to be pivoted or tilted from a horizontal position (along the ceiling) to a vertical position (directly downward) for each pan position of the assembly 1.

As above-mentioned, in normal ceiling mounting of the assembly 1, the support housing 2 would be disposed above the ceiling, while the dome 15 and shroud 20 would protrude below the ceiling and be observable. As a result, as above discussed, to make the assembly 1 as unobstrusive as possible, it is desirable that the dome 15 and shroud 20 be made as small as possible. In accordance with the principles of the present invention, a significant reduction in size of the dome and shroud as compared to prior assemblies is realized in the assembly 1, by appropriate selection and mounting of the camera assembly 14.

More particularly, in accord with the invention, camera assembly 14 comprises a solid state camera in which the solid state image pickup assembly 14a of the camera, i.e., the camera portion which receives the optical image from the lens 13, is physically separate from the main body assembly 14b of the camera, i.e., the portion which houses the control electronics for the image pickup as well as the video processing, power and other electronics of the camera.

Because the image pickup element of the image pickup assembly 14a is an integrated circuit, the assembly 14a is of substantially shorter length than the combined length of assembly 14a and main camera body 14b. This fact and the fact that the pickup and main body can be physically separate allows these components to be mounted in such a way as to realize the desired pivoting or tilting of the viewing direction 13a of the assembly 1 relative to the horizontal or x direction for each pan position of the assembly, as well as to significantly reduce the overall space required for the pivoting action. This, in turn, permits the dome 15 and shroud 20 of the assembly 1 to be of significantly less diameter and depth and, thus, of a reduced overall size.

More particularly, in accord with the invention and as shown in FIGS. 1A and 1B, only the shorter length pickup assembly 14a of the camera 14 is mounted to undergo x-direction pivoting, while the longer length camera body 14b is not required to pivot. Specifically, a pivot or tilt bracket 16 pivotally mounted to plate 7 carries the pickup assembly 14a as well as the lens assembly 13. These assemblies are joined together at a mounting part 10 so as to be in alignment with each other and the viewing direction 13a.

The pivot bracket 16 includes a main plate 16a having an aperture 16b through which the pickup assembly 14a protrudes. Capture plates 16c and 16d extend upwardly from the plate 16a at the lateral ends of aperture 16b and receive the protruding sides of the pickup assembly. Bolts 16h and 16i secure the assembly to the plates.

A pivot block 16e carried on an arm 16f of the pivot bracket 16 pivotally mounts the bracket to a support arm 7a of the rotatable plate 7. This allows the lens and pickup assemblies 13 and 14a and, thus, the viewing direction 13a, to be pivoted in the x-direction relative to the plate 7 so that at each pan position of the plate 7, the viewing direction 13a can be made to scan the surveillance area. A tilt or pivot motor 19 with a shaft 19a and mounting 19b is coupled to a second arm 16g of the bracket 16 via a coupling screw 21. The motor 19 is mounted via screws 19c to a further arm 22 which is bolted to the plate 7 via bolts 23 and imparts rotating motion to the bracket 16 causing it to pivot relative to the plate 7.

As above-discussed, the main camera body 14b of the camera 14 is separately mounted from the image pickup assembly 14a and, as can be seen from FIGS. 1 and 2, the camera body is fixedly mounted to the rotating plate 7. The exact positioning of the body 14b is selected to minimize space requirements and, as shown in FIG. 2, the body is horizontally positioned offset from the lens and pickup assemblies and with the length of its longest dimension not aligned with (i.e., not directed in) the viewing direction.

As can be appreciated, by mounting the camera 14 to the assembly 1 as above-described, the tilting or pivoting motion for the viewing direction 13a, need only accomodate the combined length of the lens and image pickup assemblies 13 and 14a, and not the combined length of these assemblies and the camera body 14b. As a result, the diameter and the depth dimensions of the cover dome 15 and the shroud 20 of the assembly can be sharply reduced relative to prior structures. In particular, an overall depth dimension of 5 inches and a diameter of 12 inches are now realizable.

The two piece configuration for the camera assembly 14 of the assembly 1 can be simply realized from available prior art solid state cameras merely by removing the image pickup and lens mounting elements of a particular camera from the camera body and placing these elements in their own housing. A suitable cable 14c can then be used to connect the image pickup 14a to the main camera body 14b. Typical cameras which can be adapted in this manner are Panasonic models Nos. WV-CD24 (black and white) and WV-CD134 (color).

Figure 4:
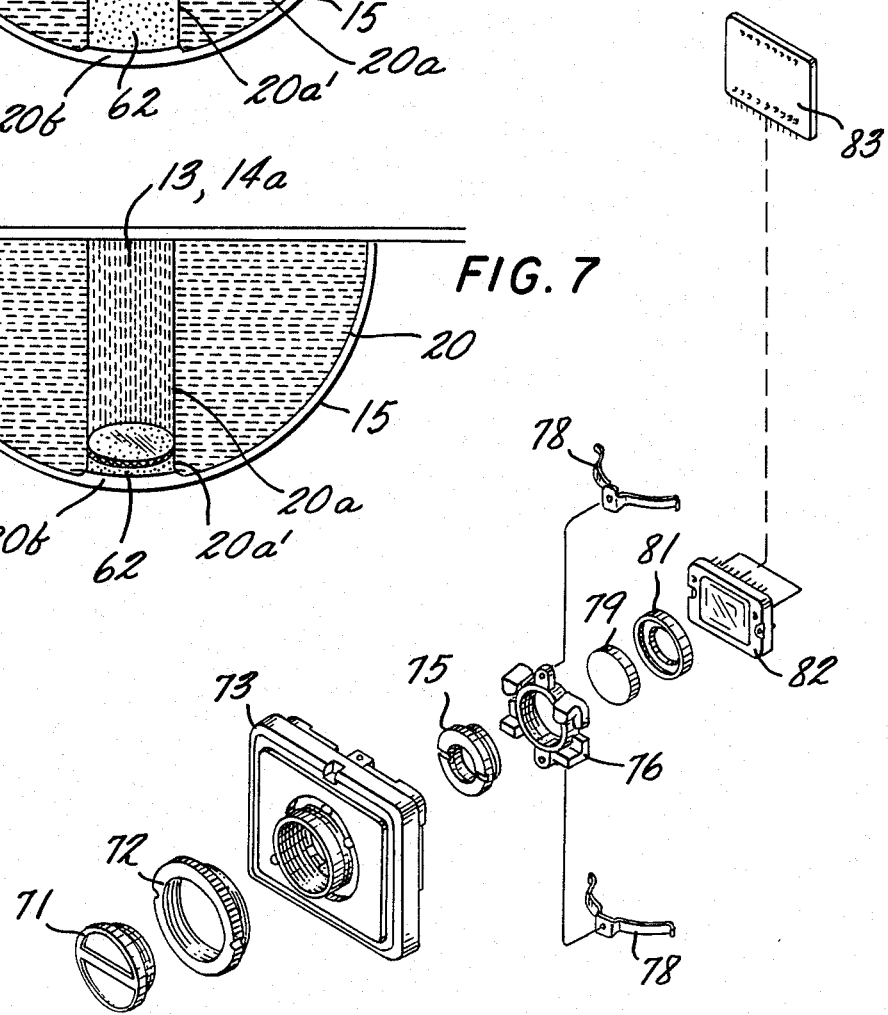
FIG. 4 shows the major components of the image pickup element of the solid state camera of the assembly of FIGS. 1A and 1B.

FIG. 4 shows, in exploded view, the elements of the former camera used to form the image pickup assembly 14a. Thus, the pickup includes, the body cap 71, FB control ring 72, front escutcheon 73, IR cover ring 75, bracket 76, springs 78, optical IR filter 79, cushion for IR 81, LSI B/W CCD assembly 82 and printed circuit board assembly 83 of the WV-CD24 camera. The main camera body 14b includes the remaining components of the camera.

As above-indicated, the camera body 14b and pickup assembly 14a are connected by the cable 14c which plugs into appropriate connectors on both units. The output video signal from the camera body 14b, in turn, is passed via a connection 24 (see, FIG. 2), cable 25 and connector 26 to a slip ring assembly 27. The latter assembly includes a stationary member 27a bolted to the bearing assembly 8 via bolts 9 and cooperating nuts 9a and a rotating member 27b which is mounted by bolt 27c and receiving bore 7d to rotate with plate 7.

The video output from the slip ring member 27a is coupled via cable 28 and connectors 29, 31 to CPU plate 33 which makes the signal available, via output connector 32, to the control station which is monitoring the surveillance information being gathered by the assembly 1. The CPU board 33 also includes further connectors 34, 35 for coupling data between the monitoring station and assembly 1 via connectors 36, 37, cable 38, slip ring 27 and data connector 39.

The CPU board 33 is protected by a plate 53 through the top of which the connectors 32, 34 and 35 extend. Screws 54 received in bores 53a connect the plate 53 to the board 33. Plate 53, in turn, is connected to housing 2 via members 56.

The data connector 39 is coupled, via a line 41, to a data block 39a on a printed circuit control board 42 supported on the plate 7. The circuit board 42 develops the control signals for the lens assembly 13 and the pan and tilt motors 11 and 19. It communicates with these components via respective connectors 42a, 42b and 42c. The board 42 also recieves auxiliary power for the pan motor 11 from a power supply 43 via cable 44 and connectors 42d and 43a. Connecting lines 45 and 46 couple the respective connectors 42b and 42c to their associated components. The connector 42a, in turn, is coupled to the lens assembly 13 via line 47, block 48 on bracket 7b, cable 49, connector 51 and cable 52.

The above configuration thus allows the lens assembly and pan and tilt motors to be controlled so as to effect panning and tilting of the field of view 13a of the assembly 1 in the desired manner. Also, this control can be effected and changed via appropriate signalling from the monitoring station receiving the surveillance information.

As discussed above, the assembly 1 is provided with a shielding or camouflaging shroud 20 having a slot 20a which defines a viewing region through which the viewing direction 13a of the assembly moves as the lens and image pickup assemblies 13, 14a are pivoted. The viewing region, i.e., slot 20a, as also above-discussed, allows for pivoting between a position where the lens and image pickup point the viewing direction 13a vertically downward (this is the case shown in FIGS. 1A and 1B) to a position where they point the direction horizontally along the ceiling line.

When pointing in these directions and in the directions therebetween, it is important that the viewing region not be readily discernible from the surveillance area, since knowledge of the position of the viewing region provides a direct indication of the position of the viewing direction. However, use of slot 20a for the viewing region tends to render the viewing region visible for particular viewing direction positions, particularly when viewing the assembly 1 from rearward of the slot.

More specifically, when the lens and pickup assemblies are positioned to direct the viewing direction directly downward, the assemblies themselves block the slot 20a so that in this position visibility of the slot is substantially obstructed. However, as the lens and pickup are tilted toward the horizontal, i.e., upward, the portion 20a' of the slot 20a below the lens and pickup are no longer blocked (those above the lens and pickup still remain blocked) and provide a path for light to pass. As a result, this lower slot portion 20a' is visible and noticeable, particularly, as above-indicated, when viewing the assembly 1 from rearward of the slot.

Figure 3:
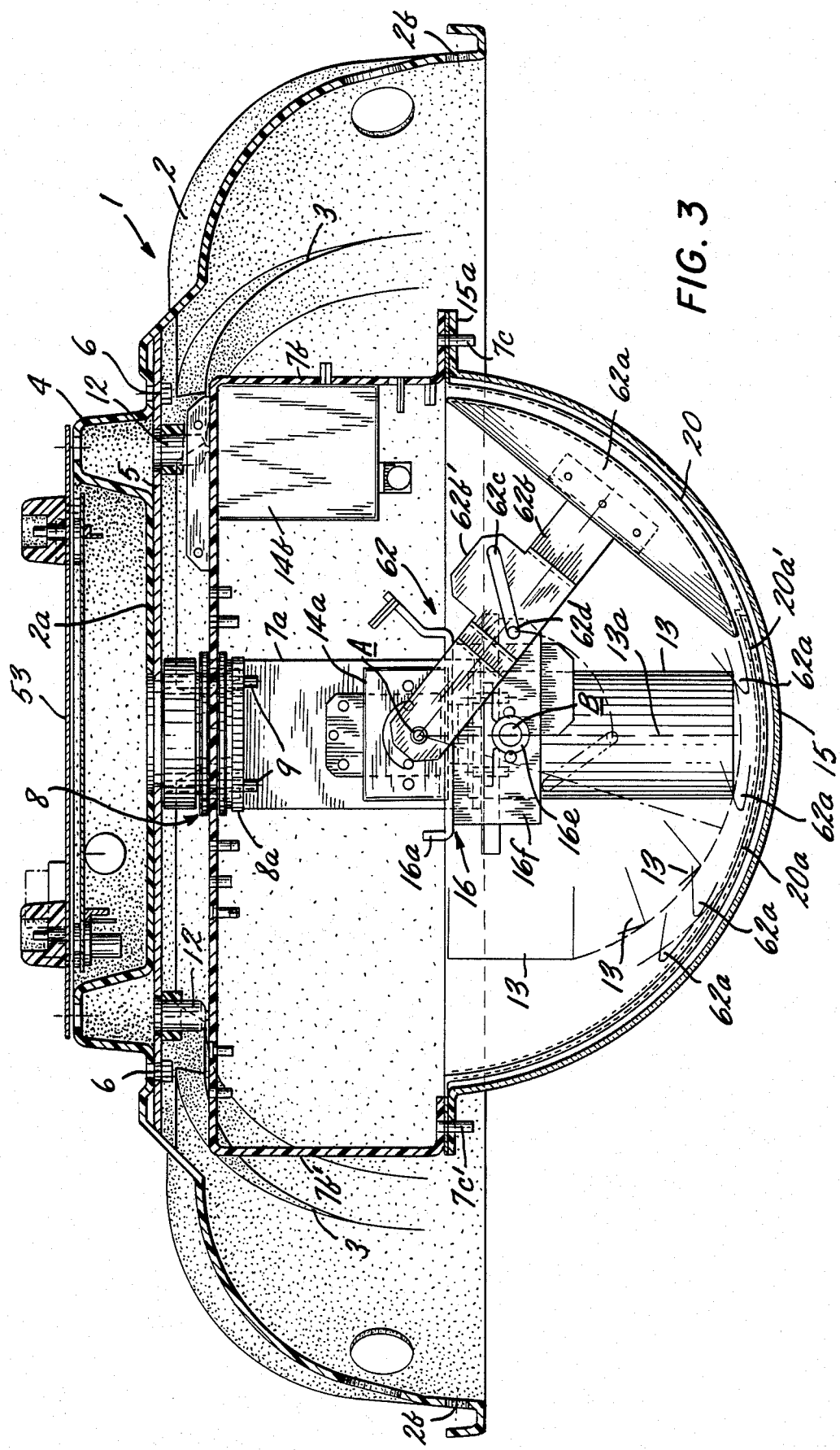
FIG. 3 also illustrates pictorially an enlarged side view of the assembly of FIGS. 1A and 1B.

In accordance with the principles of a second aspect of the present invention, the assembly 1 is further adapted to inhibit visibility of the slot 20a for substantially all tilt positions of the lens and pickup and, hence, substantially all positions of the viewing direction 13a. This is realized in the assembly 1 by use of a shutter assembly 62. The latter assembly is mounted to the assembly 1 in such a way as to closely follow the lens and pickup assemblies 13 and 14a and to be in close proximity to the shroud 20 so as to block the slot portion 20a' below the lens and pickup. As can be seen in FIGS. 1 and 3, the shutter assembly 62 comprises a shutter element 62a which, like the shroud 20 and lens assembly 13, is opaque and which is mounted in alignment with slot 20a via an arm 62b.

The arm 62b is pivotally mounted to the arm 7a of the plate 7 at a position A which is vertically and horizontally offset from the pivot position B at which the lens and pickup assemblies 13 and 14a are pivotally mounted. The offset between the pivot portions A and B is required to insure that the shutter 62a follows in close proximity to the inner surface of the shroud 20a. This would not otherwise occur if the pivot point of the arm 62b were set at the position B of the lens and pickup assemblies.

The arm 62b is further provided at an enlarged part 62b' with an inclined slot 62c. A drive pin 62d rides in the slot 62c and is connected to the arm 16f of the pivot or tilt bracket 16. As a result, as the bracket 16 is pivoted, the drive pin 62d moves along the slot 62c causing a force to be exerted on arm 62b. The arm thus pivots about point B, causing the shutter 62a to follow the pivoting motion and to block slot portion 20a' of the slot 20a below the lens and pickup assemblies.

Figure 5:
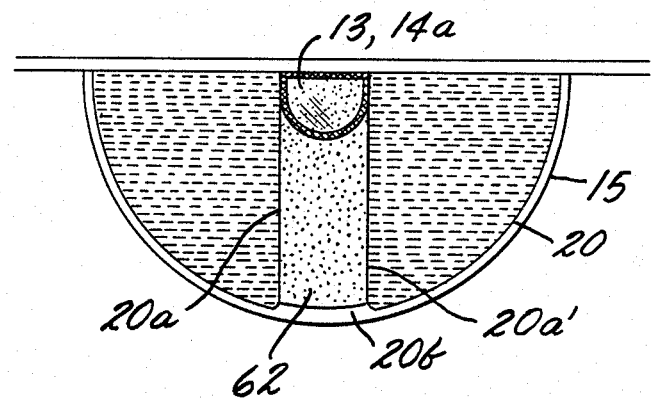
FIGS. 5–7 show pictorially various positions of the lens and shutter as they appear in the viewing slot of the assembly of FIGS. 1A and 1B.
Figure 6:
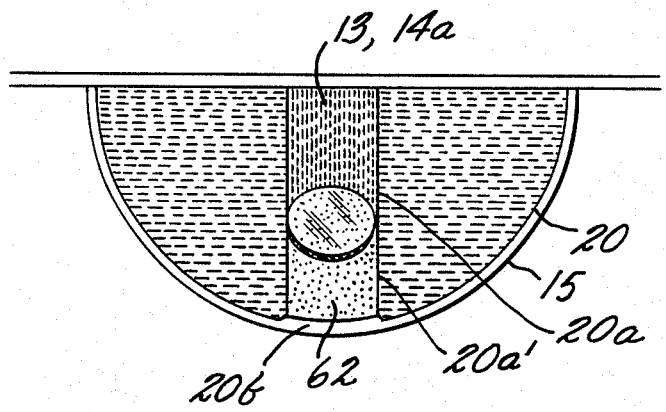
Figure 7:
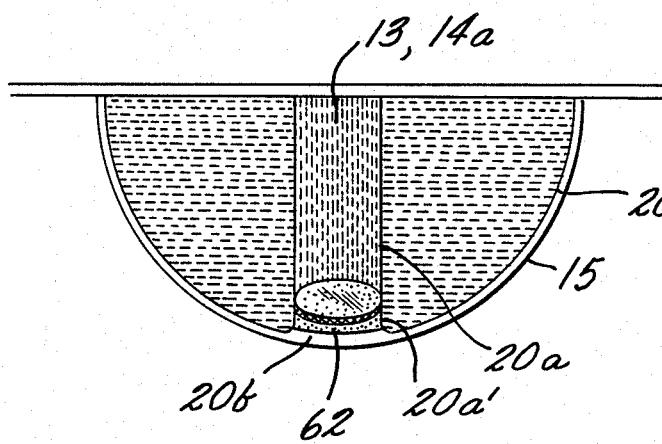

This can be seen in FIG. 3 and in FIGS. 5-7 which show various positions of the shutter 62a corresponding to various pivot or tilt positions of the bracket 16 and thus the lens and pickup assemblies. Thus, when the lens and pickup are positioned by the pivot or tilt bracket 16 so that the viewing direction 13a is vertically downward, the shutter 62a is tilted so that it covers only a small lower portion 20a' of the slot 20a, as shown in FIG. 7. In this case, the lens and pickup assemblies 13 and 14a themselves block the majority of the slot 20a which is above these assemblies, and the shutter 62a is needed to block only the negligible lower portion 20a'.

As the lens and pickup are now pivoted, the slot portion 20a' below the lens and pickup and which is not blocked by them increases. However, the shutter 62a, through the above-described driving action, pivots with the lens and pickup and now covers or blocks the increased lower slot portion 20a'. This is seen in FIG. 6 wherein the shutter 62a now blocks the increased lower slot portion 20a' and the lens and pickup block the remaining upper slot portion.

Finally, as the lens and pickup are tilted so that the viewing direction is substantially horizontal, the shutter 62a continues to block the lower slot portion 20a', which now covers substantially the entire slot, with lens and pickup blocking the minimal remaining portion of the slot. This is shown in FIG. 5. Pivoting of the lens and pickup assemblies in the opposite direction, causes opposite movement of the shutter with the shutter always blocking the slot portion 20a' below the lens and pickup and the lens and pickup blocking the remaining portion of the slot.

As can be appreciated, therefore, the shutter assembly 62 thus adds considerably to shielding of the surveillance assembly 1, by making it more difficult to determine the viewing direction 13a of the assembly. The use of the opaque shutter 62a in combination with the opaque shroud 20 also now permits the cover dome 15 to be entirely clear, thus enhancing the viewing ability of the lens and pickup and the overall appearance of the assembly 1.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A surveillance assembly comprising:
   a housing:
   means for viewing outward of said housing and producing an image;
   camera means including:
   solid state pickup means for receiving the image produced by said viewing means; and camera body means being separate from and responsive to said pickup means;
   and mounting means for mounting said viewing means and said pickup means to said housing and for mounting said body means to said housing so that said body means is separate from said pickup means.

2. A surveillance assembly in accordance with claim 1 wherein:
   said viewing means is a lens means;
   said lens means and said pickup means are commonly pivotally mounted by said mounting means and define a viewing direction for said surveillance assembly;
   and said camera body means is mounted by said mounting means with the length of its longest dimension being other than in said viewing direction.

3. A surveillance assembly in accordance with claim 2 wherein:
   said lens means and said pickup means are pivotal relative to a first direction.

4. A surveillance assembly in accordance with claim 3 wherein:
   said first direction is the horizontal direction.

5. A surveillance assembly in accordance with claim 3 wherein:
   said mounting means mounts said lens means, said pickup means and said camera body means so as to be rotatable about a second direction.

6. A surveillance assembly in accordance with claim 5 wherein:

said first direction is the horizontal direction and said second direction is the vertical direction.

7. A surveillance assembly in accordance with claim 5 wherein:
said mounting means comprises:
a first plate mounted to said housing so as to be rotatable about said second direction; and second plate mounted to said first plate so as to be pivotable about said first direction;
said camera body means is mounted to said first plate; and said lens means and pickup means are mounted to said second plate.

8. A surveillance assembly in accordance with claim 7 wherein:
said second plate has an aperture therethrough;
and said lens means and pickup means are mounted to said second plate so as to extend through said aperture.

9. A surveillance assembly in accordance with claim 7 wherein:
said first plate includes first and second arms extending in a direction outwardly of said housing;
and second plate is pivotally supported between said arms.

10. A surveillance assembly in accordance with claim 9 wherein:
said camera body means is mounted to said first plate in spaced relationship to said arms.

11. A surveillance assembly in accordance with claim 10 wherein:
the longest dimension of said camera body means parallels the direction between said arms.

12. A surveillance assembly in accordance with claim 1 further comprising:
cable means for connecting said pickup means to said camera body.

13. A surveillance assembly in accordance with claim 1 further comprising:
a means for covering said housing to enclose said viewing, camera and mounting means and for allowing said viewing means to view outward of said housing.

14. A surveillance assembly in accordance with claim 13 wherein:
said mounting means pivotally mounts said viewing means to said housing; and
said cover means has a region which is at least partially transmissive to light and through portions of which said viewing means views as said viewing means is positioned by said pivoting.

15. A surveillance assembly in accordance with claim 14 further comprising:
means for blocking the transmission of light through portions of said region other than the portion through which said viewing means is positioned to view.

16. A surveillance assembly in accordance with claim 15 wherein:
the portions of said region for which the transmission of light is blocked are those below the portion through which said viewing means is positioned to view.

17. A surveillance assembly in accordance with claim 16 wherein:
the portions of said region for which the transmission of light is blocked are substantially all portions of said region below the portion through which said viewing means is positioned to view.

18. A surveillance assembly in accordance with claim 15 wherein:
said cover means comprises a dome-like shroud, said dome-like shroud having a sector forming said region;
said blocking means comprises a shutter;
and said mounting means mounts said shutter to move through and block said sector in response to pivoting of said viewing means.

19. A surveillance assembly comprising:
a housing;
means for viewing outward of said housing and producing an image;
camera means for receiving the image produced by said viewing means;
mounting means for mounting said viewing means and camera means to said housing;
means for covering said housing to enclose at least said viewing means and camera means, said cover means having a region which is at least partially transmissive to light and through portions of which said viewing means views outward of said housing;
and means for blocking the transmission of light through portions of said region other than the portion through which said viewing means is positioned to view.

20. A surveillance assembly in accordance with claim 19 wherein:
the portions of said region for which the transmission of light is blocked are those below the portion through which said viewing means is positioned to view.

21. A surveillance assembly in accordance with claim 20 wherein:
the portions of said region for which the transmission of light is blocked are substantially all portions of said region below the portion through which said viewing means is positioned to view.

22. A surveillance assembly in accordance with claim 19 wherein:
said mounting means pivotally mounts said viewing means to said housing;
said cover means comprises a dome-like shroud, said dome-like shroud having a sector forming said region;
said blocking means comprises a shutter;
and said mounting means mounts said shutter to move through and block said sector in response to pivoting of said viewing means.

23. A surveillance assembly in accordance with claim 22 wherein:
said mounting means pivotally mounts said shutter to said housing so as to cause said shutter to follow the contour of said shroud adjacent to said sector.

24. A surveillance system in accordance with claim 23 wherein:
the pivot positions of said viewing means and said shutter are offset.

25. A surveillance assembly in accordance with claim 24 wherein:
said mounting means comprises a first plate pivotal about a first direction and mounted at a first point of said mounting means;
said viewing means is mounted to said first plate; and said shutter means comprises:
an arm having one end pivotally mounted to said mounting means at a second point and being responsive to said first plate; and a shutter mounted to a second end of said arm so as to be adjacent to said shroud.

26. A surveillance assembly in accordance with claim 25 wherein:
said arm includes a slot;
and said mounting means further includes a drive bar connected to said first plate and passing through said slot.

27. A surveillance assembly in accordance with claim 22 wherein:
said shroud is opaque other than in said sector.

28. A surveillance assembly in accordance with claim 27 wherein:
said sector is formed as a slot in said shroud.

29. A surveillance assembly in accordance with claim 28 wherein:
said slot runs vertically circumferentially from the apex of said shroud to a point vertically circumferentially removed from said apex;
said viewing means is pivoted relative to the horizontal and when said viewing means is perpendicular to the horizontal said viewing means views through the portion of said slot at said apex of said shroud and when said viewing means is parallel to said horizontal direction said viewing means views through the portion of said slot at said point of said shroud;
and said shutter means is pivoted relative to the horizontal and when said viewing means is perpendicular to the horizontal said shutter means is substantially removed from said slot adjacent said apex and when said viewing means pivots towards said horizontal said shutter means pivots to block and said slot from adjacent said apex to adjacent said viewing means.

30. A surveillance assembly in accordance with claim 29 wherein:
some dome-like means further comprises an outer dome-like member surrounding said shroud.

31. A surveillance assembly in accordance with claim 30 wherein:
said outer dome is light transmissive over its entire surface.

32. A surveillance assembly in accordance with claims 31 wherein:
said outer dome is entirely clear.

33. A surveillance assembly in accordance with claim 2 wherein:
the length of the longest dimension of said camera body means is transverse to said viewing direction.

* * * * *

UNITED STATES PATENT AND TRADEMARK OFFICE
CERTIFICATE OF CORRECTION

PATENT NO.   :   4,833,534
DATED        :   May 23, 1989
INVENTOR(S)  :   Robert Paff et al.

It is certified that error appears in the above-identified patent and that said Letters Patent is hereby corrected as shown below: Title page:

Item [75] should read Robert Paff, Boca Raton; Edwin Thompson,
    Loxahatchee; Norbert M. Stiepel, Coral Springs; Luis Anderson,
    Boca Raton, all of Florida.
Col. 3, line 15, change "in" second occurrence to -- with --.
Col. 3, line 17, after "together" insert -- illustrate --.
Col. 3, line 32, change "illustrates" to -- illustrate --.
Col. 3, line 54, change "accomodate" to -- accommodate --.
Col. 3, line 55, change "embalances" to -- inbalances --.
Col. 5, line 46, change "accomodate" to -- accommodate --.
Col. 12, line 8, delete "and".
Col. 12, line 20, change "claims" to -- claim --.

Signed and Sealed this

Twentieth Day of March, 1990

Attest:

JEFFREY M. SAMUELS

Attesting Officer

Acting Commissioner of Patents and Trademarks